United States Patent [19]
Johnson

[11] Patent Number: 5,411,663
[45] Date of Patent: May 2, 1995

[54] ALCOHOL-INSOLUBLE NYLON MICROPOROUS MEMBRANES

[75] Inventor: James S. Johnson, Acton, Mass.

[73] Assignee: Micron Separations, Inc., Westborough, Mass.

[21] Appl. No.: 32,792

[22] Filed: Mar. 17, 1993

[30] Foreign Application Priority Data

Mar. 20, 1992 [WO] WIPO ................ PCT/US92/02293

[51] Int. Cl.$^6$ .............................................. B01D 71/56
[52] U.S. Cl. ................................... 210/500.38; 264/41
[58] Field of Search .................... 210/500.38, 651, 652, 210/490, 638; 264/41, 49

[56] References Cited

U.S. PATENT DOCUMENTS 4,064,086 12/1977 Cowsar et al. ................ 260/29.2 R
5,154,829 10/1992 Degen et al. .............. 210/500.38 X Primary Examiner—Frank Spear
Attorney, Agent, or Firm—Bruce F. Jacobs

[57] ABSTRACT

Alcohol-insoluble polyamide (nylon) microporous separation membranes are prepared from alcohol-soluble polyamide (nylon) polymers. The membranes are hydrophilic and contain crosslinked amide groups of the structure:

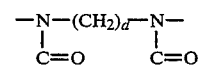

wherein d is an integer of about 1 to 3.

25 Claims, No Drawings

ALCOHOL-INSOLUBLE NYLON MICROPOROUS MEMBRANES

FIELD OF THE INVENTION

The present invention is directed to alcohol-insoluble polyamide (nylon) microporous membranes. Surprisingly, the alcohol-insoluble microporous membranes are prepared from alcohol-soluble polyamide (nylon) resins. The resins are known as "type 8 nylons" and are N-alkoxyalkylated nylons. It was particularly unexpected that alcohol-insoluble microporous membranes could be prepared from an alcohol-soluble nylon resin because the previous polyamide microporous membranes prepared from alcohol-soluble nylon resins had always been alcohol soluble. Also the microporous membranes of this invention are hydrophilic. This is surprising for at least some of the membranes because previous microporous membranes prepared from polyamide resins having a ratio of methylene $CH_2$ to amide NHCO groups which is greater than about 7 have been hydrophobic. The membranes are microporous sheets having an absolute particle removal capability in the range of about 0.1 micron and larger. The term "alcohol-soluble" is used herein to refer to materials which are soluble in lower aliphatic alcohols such as methanol and ethanol.

BACKGROUND OF THE INVENTION

The prior art is replete with various nylon membranes. However, the microporous membranes which have been prepared from alcohol-soluble nylon resins heretofor have been alcohol soluble and this has so verely restricted the usefulness of the membranes.

For example, Lovell et al. (U.S. Pat. No. 2,783,894) and Paine (U.S. Pat. No. 3,408,315) provide a process for producing alcohol-soluble polyamide membrane sheet using nylon 4 (poly-ε-butyrolactam). The membranes are prepared by forming an alcohol-water solution containing the nylon 4, adjusting it to the point of incipient precipitation by the addition of a solvent miscible nonsolvent which decreases the solubility of the nylon, casting the solution on an optically smooth surface of a solid base, and converting to a solid film by exposure to an atmosphere containing a constantly maintained concentration of exchangeable nonsolvent vapors, i.e. vapors of a liquid in which the nylon is not soluble but which are exchangeable with vapors of the solvent for the nylon. The resultant membranes are soluble in alcohol, as well as in a considerable number of other solvents, and may not be steam sterilized, which limits the scope of their usefulness.

Hiratsuka et al. (U.S. Pat. No. 3,746,668) also prepares membranes from alcohol solution of alcohol-soluble polyamides, gelling the solution by addition of a cyclic ether gelling agent, and drying the film. Alcohol-soluble relatively low molecular weight random copolymers of nylon 6 (poly-ε-caprolactam), nylon 66 (polyhexamethylene adipamide), and nylon 610 (polyhexamethylene sebacamide) are taught.

Marinaccio et al. (U.S. Pat. No. 3,876,738) describes a process for producing microporous membrane sheets from both alcohol-soluble and alcohol-insoluble nylon resins. In each case, however, the resulting membranes retain the alcohol solubility characteristic of the initial nylon resin.

Pall (U.S. Pat. No. 4,340,479) discloses alcohol-insoluble hydrophilic polyamide resin membrane sheets which are stated as only being preparable from alcohol-insoluble polyamide resins having a ratio of $CH_2$:NHCO within the range from about 5:1 to about 7:1. A second Pall patent (U.S. Pat. No. 4,340,480) which was divided out of a common parent application discloses alcohol-insoluble hydrophobic polyamide resin membrane sheet which are stated as only being preparable from alcohol-insoluble polyamide resins having a ratio of $CH_2$:NHCO which is greater than about 7:1.

Type 8 Nylon polymers have been formed into films and have been known to have use as porous membranes in permeation separations of fluid mixtures, particularly the desalination of sea water. Hoehn (U.S. Pat. No. 3,497,451) discloses this and teaches the preparation of thin films thereof by casting. The films produced are not microporous. Similarly, N-methoxymethylated nylon-3 polymers have been disclosed as useful to prepare membranes for the pervaporation of a water/alcohol mixture in Suzuki et al., J. Applied Polymer Science, Vol. 32, 4573–4580 (1986).

Japanese Kokai 48-42050, laid open Jun. 19, 1973, discloses an improved method of crosslinking N-alkoxymethyl substituted polyamides (type 8 nylons) which are in methanol solutions. The crosslinked or cured material is produced by forming a 0.08 mm film of a methanol solution of an alcohol- soluble substituted nylon (having a degree of methoxylation of 30%) and then crosslinking the film. The resultant cured film exhibited good physical properties but contained no porosity. The reference contains no suggestion of providing porosity in the films let alone that such films even could be porous. It contains no teaching of how one should attempt to produce such porosity, especially in a regular and controlled manner as is required to yield commercially useful hydrophilic microporous separation membranes.

The chemical distinctions between alcohol-insoluble polyamide resins such as nylon 66 and alcohol-soluble type 8 nylons are art-recognized. Also art-recognized has been the similarity of properties of the alcohol-soluble resins, especially for membranes. A review of the treatise by Dr. Robert E. Kesting entitled: *Synthetic Polymeric Membranes*, Second Edition, J. Wiley & Sons (1985) establishes these facts. Kesting teaches that methoxymethylated nylon 66 (a type 8 nylon) and nylon multipolymer (66,610, and 6) are linear polymers whose structural regularity has been so diminished that intermolecular hydrogen bonding between amide groups is significantly less likely. The result is that these polymers are in the amorphous state (with properties somewhat between those of glass and rubber) and are alcohol soluble. Type 8 nylon may be crosslinked by the inclusion of citric acid in its solutions and heating the finished membrane. Both polymers exhibit considerable potential for use in membranes and in ancillary areas. Indeed the excellent strength and flexibility of amorphous nylon 66, 610, 6 multipolymer, together with its compatibility with crystalline high MW nylon 66 in formic acid solutions, has resulted in its inclusion in high-strength nylon-blend membranes.

Kesting thus teaches several important things. It discusses type 8 nylon resins in the same paragraph and sentence as the nylon terpolymers which contain blocks of (a) nylon 66, (b) nylon 6, and (c) nylon 610. Kesting thus equates the type 8 nylon polymer and the terpolymer, at least in the field of synthetic polymer membranes, to be (i) equivalent to each other and (ii) readily distinguishable from nylon 66. The scientific basis for Kesting's conclusion is supported by the chemical properties which are important for synthetic polymer membranes and which are possessed by both alcohol-soluble type 8 nylon and the alcohol-soluble terpolymer, and which are opposite to the properties found in alcohol-insoluble nylon 66.

The terms "hydrophilic" and "hydrophobic" are relative terms referring to the water-wetting capacity of a membrane. For the purposes of commercial practicality and this invention, a membrane is hydrophilic if it is wet by water substantially spontaneously, i.e. in the absence of an externally applied pressure to force water into the pores. Hydrophilic microporous membranes are useful in the separation of components present in an aqueous solution generally without requiring the addition of a surface active agent (surfactant) to the solution. The addition of foreign materials such as surfactants is not possible or desirable in many separation applications, as for example, in assaying bacteria, since some bacteria are killed by surfactants. In other applications, filtering media cannot be adulterated by the addition of surfactants without deleterious consequences.

Accordingly, it is an object of the present invention to produce alcohol-insoluble hydrophilic microporous polyamide membranes from alcohol-soluble polyamide resins.

It is a still further object of the present invention to produce such membranes by a relatively non-complex and non-polluting manufacturing process.

DISCLOSURE OF THE INVENTION

Accordingly, the present invention is directed to alcohol-insoluble hydrophilic polyamide (nylon) membranes which are prepared from a specific class of alcohol-soluble polyamide resins. Specifically the membranes contain crosslinked amide groups of the structure:

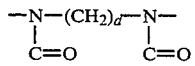

wherein d is an integer of about 1 to 3. The starting alcohol-soluble polyamide resins are partially N-alkoxyalkyl substituted polyamide polymer resins, preferably wherein about 10 to 70% of the amide groups are so substituted.

The invention is also directed to methods of (i) manufacturing the microporous membranes and (ii) using the membranes in separation and hybridization applications.

DESCRIPTION OF THE PREFERRED EMBODIMENTS

The alcohol-insoluble hydrophilic polyamide (nylon) membranes of the present invention are prepared from a specific family of alcohol-soluble polyamide resins which are generally known as type 8 nylon resins. The resins are polymers of at least partially N-alkoxyalkyl substituted polyamides. Such polymers contain groups of the formula:

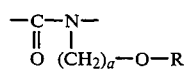

wherein a is an integer from about 1 to 3 and R is hydrogen or an alkyl group having about 1 to 6 carbon atoms. The substituted amide groups are separated by one or more methylene (CH$_2$) and/or amide (CONH) groups. Preferred such resins generally have the formula:

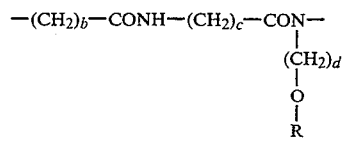

wherein b is an integer of about 2 to 10, c is an integer of about 2 to 10, d is an integer of about 1 to 3, and R is hydrogen or an alkyl group having about 1 to 4 carbon atoms. Suitable such resins generally have a ratio of CH$_2$ methylene groups to NHCO amide groups which ranges from about 2.3 to about 15, preferably about 5 to 12, and most preferably about 8 to about 10.

Type 8 nylons were invented and initially commercialized by dupont in the late 1940's. They were first sold under the names Zytel 81 and 8001. The number "8" used to identify the nylons does not correspond with Caruther's numerical identification system, i.e. 66, 46, 6, 610, etc., for the linear polyamides (nylons) which is based on the number of carbon atoms in the basic monomers used to prepare the polymers. Type 8 nylons are prepared by the reaction of a linear nylon such as nylon 66, 610, 46, etc. with, for example, a combination of formaldehyde and methanol when an N-methoxymethylated derivative is to be prepared. The net result of the chemical reactions is that a substantial portion of the CONH amide groups in the original nylon no longer exist in the type 8 Nylon and the total number of CH$_2$ groups is increased.

The modified polyamides of which the hydrophilic alcohol-insoluble microporous membranes of this invention are made are described in such as U.S. Pat. No. 2,430,860, the subject matter of which is incorporated herein by reference. Suitable such polyamide resins are currently commercially available materials from Belding Chemical Company (BCI), Hendersonville, N.C. and are prepared by the methoxymethylation of a nylon 66 polymer. Generally about 10 to about 70% of the amide groups are modified, preferably about 25 to about 55%, and most preferably about 35 to about 45%.

The modified type 8 polyamide alcohol-soluble resins turn into the alcohol-insoluble microporous membranes due to reaction between the N-alkoxyalkyl substituents and the unsubstituted amide groups which are present, generally on other polymer chains. The crosslinking reaction is acid-catalyzed and may be accomplished either with or without compounds which can form crosslinking bridges. The general crosslinking reaction between a methoxymethyl group and an amide (CONH) group is:

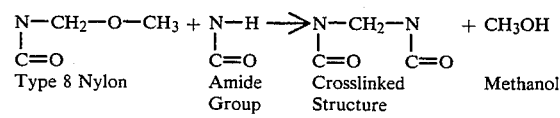

Suitable compounds which form a bridge for the reaction between an alkoxyalkyl group and an amide are those which are multifunctional organic acids, anhydrides, lactones, and esters. Examples of such compounds include maleic acid, maleic anhydride, gamma-butyrolactone, acetoacetic ethyl ester, and the like. The bridges can serve as further chemical reaction sites, binding sites when the membranes are used in hybridization, and to alter the solubility or other physical properties of the membranes. It is currently preferable to use no bridge compound. Alternatively or additionally the incorporation of certain compounds such as glutaraldehyde into the casting solution have been observed to produce membranes with properties particularly beneficial for hybridization applications.

To prepare the alcohol-insoluble hydrophilic microporous membranes of this invention, suitable solvents and nonsolvents for the type 8 nylon are blended along with a bridge compound or other such additive (when such are used), then the type 8 nylon is mixed into the liquid until dissolved. The solvents are generally weak or strong acids. Suitable such acids include but are not limited to hydrochloric acid, formic acid, phosphoric acid, acetic acid, citric acid, propionic acid, and mixtures thereof. Alcohols may also be used as solvents but to produce the alcohol-insoluble membranes of this invention, a sufficient amount of an acid must also be present in the solution to effect a sufficient but not excessive amount of crosslinking. Although it is possible to add the acid immediately prior to casting of the membrane, such is not currently recommended due to the difficulty in controlling the procedure and in maintaining product uniformity. The nonsolvents are chosen based upon compatability with the polymer and solvents which when mixed with the polymer and solvents result in the desired pore size of the microporous membranes. Suitable nonsolvents are generally polar liquids which include, but are not limited to, alcohols such as methanol, ethanol, and propanol; organic acids such as citric acid; water; aqueous salt solutions; and mixtures thereof. Some compounds, e.g. citric acid, can function as either a solvent or a nonsolvent depending upon its concentration in a specific system. Because greater proportions of type 8 nylon polymer in the mix produce smaller pores in the resulting membrane, a range of pore sizes from about 0.1 to about 20 um can be produced from the range of about 10 to 25 wt. % type 8 nylon polymer, added to a mix of about 15 to 90 wt. % solvent, about 0 to 75 wt. % nonsolvent and up to about 5 wt. % bridge compound or other product enhancers.

Type 8 nylon is slowly added into the mixing solvents and optional nonsolvents, generally at a temperature in the range of about 5° to 65° C. and preferably about 25° to 45° C., at a speed sufficient to prevent the polymer from clumping but insufficient to cause overheating. Within the range, higher temperatures cause dissolution to proceed more rapidly and the mix time to total dissolution can be decreased. A variety of mixing devices for blending solids with liquids to form viscous fluids are known in the art. The mix times to dissolve the polymer generally range up to about 6 hours, depending on the physical state of the polymer; a finely powdered polymer will dissolve more quickly than an extruded pelletized polymer. After the dissolution is completed, the mix is generally filtered to remove any extraneous particles which might cause a problem in casting of the resulting lacquer or produce occlusions in the resulting membrane. Air bubbles created in the mixing step are then eliminated, preferably by allowing the solution to stand undisturbed.

The solution is then cast into the shape of the desired material. Generally, the membranes are cast by dispersion of the type 8 polyamide resin solution into a uniformly thick film, preferably upon a non-woven web material, by drawing a cloth web through a conventional knife box coating mechanism which controls the thickness of the coating. The polymer coated web is then passed through a casting bath comprised of nonsolvents for the type 8 nylon such that a microporous alcohol-insoluble polymer is precipitated in a uniform, consistent manner. The casting bath may contain solvents for the type 8 nylon but at concentrations low enough to not prevent precipitation of the polymer. A range of different pore sizes can be produced from a single batch of casting solution, depending upon the composition of the bath. Most commonly, the casting bath contains nonsolvents for the starting alcohol-soluble type 8 nylon polymer, nonsolvents for the alcohol-insoluble membrane, and some solvent and nonsolvents from the polymer casting solution. Thereafter, the resulting membrane is rinsed and dried.

As noted, the relative proportions of the type 8 nylon and the solvents and nonsolvents therefor determine in part the pore size and density of the resulting material. Since a higher solution temperature can result in somewhat larger pore sizes, temperature controls during the casting can be used to manipulate the pore size of the resulting membrane. The casting system can include temperature controls, preferably a heat exchanger, to change the viscosity of the casting mixture as is necessary to obtain a smooth even coating of the mixture. As the temperature of the mixture rises and as the higher temperatures are maintained for longer periods of time, pore size is increased. This feature allows production flexibility because a solution's temperature can be manipulated to produce a range of pore sizes from a single batch of casting lacquer solution. The composition and process temperature control manipulations enable continuous production of the material with fixed and variable pore size and distribution from a single batch of type 8 nylon solution.

The alcohol-insoluble microporous type 8 polyamide membranes preferably have a uniquely bimodal pore structure, i.e. large interconnecting pores or chambers that do not appear at the surface of the membrane and micropores (about 0.1 to about 20 um in diameter) that are on the surface, when viewed by a scanning electron microscope. The pores extending through the membrane would thus not have a substantially uniform shape and size. To produce type 8 polyamide membranes which are skinless, i.e. there is essentially no bimodal pore structure and the pores which extend through the membrane from one surface to the other are either substantially uniform or slightly tapered, one would generally modify the polymer solution so that it was essentially at the precipitation point of the specific polymer and also modify the casting bath so that it is closer to being a solvent for the polymer.

The membranes may have any desired thickness as is conventional in the microporous membrane art. Generally the membranes will be about 50 to 200 um thick. Increasing the thickness of the membranes decreases the apparent pore size of the membrane without significant effect on the water flow rate.

The alcohol-insoluble polyamide microporous membranes exhibit a superior heat resistance than the original polyamide resins from which the type 8 nylon polymers are prepared. For instance, after heating for 15 minutes at 280° C. for 15 minutes in nitrogen, a nylon 66 membrane is destroyed while the corresponding type 8 nylon membrane appeared unaffected and was instantly wettable by water. The membranes of this invention can withstand higher temperatures than nylon 66 membranes.

The resulting alcohol-insoluble, microporous type 8 polyamide resin membrane has a different chemical structure than both previous alcohol-insoluble and previous alcohol-soluble microporous membranes. The resulting membranes have been found to exhibit superior performance to commercial samples of standard nylon 66 membranes when evaluated by an independent laboratory for use in Southern alkali blotting, Southern blotting, and plaque lifting tests. As such, the replacement of the hydrogen (H) atom from only a portion of the CONH amide groups of a polyamide polymer has been found to substantially change the properties of the polyamide resin membrane and produce a unique molecule having superior properties, especially for use in hydridization tests including Southern alkali blotting, Southern blotting, and plaque lifting tests. Such tests are routinely performed in the biotechnology and related industries and since procedures for so doing are in the literature, they do not need to be more fully specified herein.

In the following non-limiting examples, all parts and percents are by weight unless otherwise specified.

EXAMPLE 1

A casting dope was made by mixing 45.7 g reagent grade hydrochloric acid, 134.8 g of 63 wt-% aqueous citric acid, 45.1 g of a type 8 nylon having 43% methoxymethyl-substituted nylon 66 (Belding Chemical #819 nylon), and 4.5 g of reagent grade maleic acid. To insure that the maleic acid was incorporated in the crosslinking bridge, all ingredients except for the nylon were combined before adding the polymer. The nylon polymer was dissolved by mixing with a standard laboratory mixer for 3 hours while being maintained at room temperature by a water bath. Once the polymer was fully dissolved, the solution was screened through a fine nonwoven polyester cloth to remove any coarse foreign particles and allowed to degas overnight. The resulting solution became a golden yellow color and had about the same solution viscosity as similar mixes prepared without the addition of maleic acid.

This solution (casting dope) was coated or cast onto a nonwoven polyester support cloth and immersed in a gelation bath consisting of citric acid and water at specific gravity 1.23. After five minutes the membrane was removed from the gelation bath, washed with water for 30 minutes, and then air dried in a laboratory convection oven at 65° C. for one-half hour.

The membrane thus produced was found to be about 120 micrometers thick, wet instantly when contacted with pure water, had a bubble point of 15 psi (indicating a pore size of about 0.75 micrometer), and had a water flow rate of 89 cc/cm$^2$/min at 10 psig pressure drop.

This membrane was tested in two genetic engineering hybridization applications: DNA plaque lifts and Southern blots at two DNA concentration levels. The membrane of Example 1 gave results superior to control membranes made from both nylon 46 and nylon 66 in terms of strength and clarity of signal.

EXAMPLE 2

The membrane was prepared by the same procedure as in Example 1 except the casting dope solution contained 53.0 g hydrochloric acid, 156.5 g of 63 wt % citric acid in aqueous solution, 52.3 g of the type 8 nylon, and 11.9 g of 50% glutaraldehyde. All other ingredients were combined before adding the polymer. The finished, screened solution possessed an amber color and had about the same viscosity as Example 1. When cast into a membrane as in Example 1, the membrane was found to have a thickness of 120 micrometers, a water bubble point of 44 psi, and a pure water flow rate of 15.8 cc/cm$^2$/min at 10 psig pressure differential. The data indicates formation of an integral membrane free of pinhole defects with an absolute pore size of about 0.2 micrometer and a water flow rate for the given pore size that is equivalent to or better than the best membranes in the industry having the same pore size rating. This membrane also rewet instantly when contacted with pure water. When evaluated for hybridization uses, the membrane gave enhanced signal with minimal background and thus was superior to both nylon 46 and nylon 66 control membranes in both DNA plaque lifts and Southern blots.

EXAMPLE 3

Example 2 was repeated with the same casting dope composition but the mix size was tripled. The resulting membrane measured 140–150 micrometers in thickness. It had a water bubble point of 42 psi and a water flow rate of 9.4 cc/cm$^2$/min at 10 psig differential pressure. This filter also wet spontaneously when contacted with water. The lower water flow rate is due to the proportionate increase in membrane thickness.

EXAMPLE 4

The effect of polymer concentration in the casting solution was tested by producing a casting solution containing 15% of the type 8 nylon of Example 1 (as compared to 20% in the preceding examples). A casting solution was prepared using the procedure of Example 1 but containing 47.3 g HCl, 139.5 g of 63 wt % aqueous citric acid solution and 32.9 g of the type 8 nylon polymer. The resulting membrane was 120 micrometers thick, had a water bubble point of 5 psi and had a water flow rate of 320 cc/cm$^2$/min at 10 psig differential pressure. The membrane was integral, pinhole free, had a pore size of about 10 micrometers and a high flow rate commensurate with its pore size. The larger pore size resulted from the lower casting solution polymer concentration and shows that pore size can be controlled by composition of the casting solution.

EXAMPLES 5, 6, and 7

The relative wettability of the derivatized and cross-linked polyamide membranes (Examples 5 and 6), as compared to commercial nylon 46 and nylon 66 membranes, was tested by subjecting two different pore sizes of the various membranes to increasing concentrations of aqueous sodium chloride solutions. Increasing concentrations of aqueous sodium chloride have increasing surface tensions making it more difficult to wet surfaces and spontaneously permeate membranes. Membrane samples (Example 7) were also prepared incorporating maleic acid in the bridging crosslink by adding 5% maleic acid by weight of the polymer to the casting solution as in Example 1. Disks 47 mm in diameter of each membrane were placed on the surface of the various sodium chloride solutions and the time for each membrane to wet through was determined. The results given in Table 1 below, show that maleic acid incorporated in the crosslinking bridge produces membranes which are more wettable than nylon 66 but less wettable than nylon 46. Without the maleic bridge, the new membrane was less wettable than the nylon 66 control membrane.

TABLE 1

RELATIVE WETTABILITY OF MEMBRANES
Time To Wet (sec)

| NaCl Solution % | MSI(1) Nylon 46 0.2 um | Pall(2) Nylon 66 0.2 um | Example 5 0.1 um | Example 6 0.2 um | Example 7 0.2 um |
|---|---|---|---|---|---|
| 0 | instant | instant | instant | instant | instant |
| 5 | instant | <1 | <1 | <1 | instant |
| 10 | instant | 1.8 | 1.6 | 1.8 | <1 |
| 15 | instant | 18 | 38 | 45 | 3 |
| 20 | <1 | 170 | >600 | >600 | 42 |

(1)Micron Separations, Inc. product #NO2SP
(2)Pall Corporation product #NRG47100

EXAMPLE 8

The solubility of the derivatized and crosslinked polyamide membrane of Example 6 was tested by placing samples of the membrane along with a control nylon 66 sample in 90% formic acid at room temperature. Both samples dissolved. This indicates that, despite the crosslinking of the derivatized polymer creating a membrane which is alcohol insoluble, the crosslinking is not so extensive as to render the polymer insoluble in high concentrations of such a strong acid.

EXAMPLE 9

A melting point test was conducted to compare the melting points of a crosslinked polyamide membrane of this invention with that of commercial nylon 66 membranes. Samples of nylon 66 membrane and a crosslinked type 8 nylon membrane prepared as in Example 6 were placed in a bomb that was purged and filled with inert nitrogen. The bomb with the membranes inside was heated in a laboratory oven to 280° C. for 15 minutes. Upon opening the bomb, the nylon 66 sample was observed to have been completely destroyed by melting while the crosslinked type 8 nylon sample appeared uneffected and remained instantly wettable by water.

Similar tests were run by heating samples of each polymeric membrane in air for 15 minutes at 245° C. and then testing the membranes for wettability. The nylon 66 sample did not rewet quickly, i.e. within 10 seconds, with water. Rather, the water remained substantially on the surface of the membrane. The lack of wetting indicating that its wettability had been substantially impaired whereas the crosslinked type 8 polyamide membrane rewet just as quickly as before heating.

EXAMPLE 10

To determine the effect of various casting conditions on the membranes produced from the type 8 nylon polymers, twelve grams of the type 8 nylon of Example 1 was dissolved in a solution containing 22.4 g reagent grade hydrochloric acid, 42.6 g powdered citric acid, and 25.0 g water by mixing 13 hours at room temperature. This procedure after screening through a nonwoven polyester cloth gave a solution of about 1500 centipoise viscosity as measured by a standard viscosity cup. This casting solution was used to form membranes under five different conditions with the results given below in Table 2. The results indicate that the casting conditions, particularly the composition of the immersion fluid, have a powerful influence over the properties of the membrane.

TABLE 2

MEMBRANE PERFORMANCE UNDER VARIOUS CASTING CONDITIONS

| Casting Conditions | Thickness (um) | Water Bubble Point (psi) | Pore Size Rating (um) | Water Flow Rate(1) |
|---|---|---|---|---|
| Cast onto glass plate; immersed in pure water | — | — | — | very low flow |
| Cast onto glass plate immersed in 1.10 sp gr citric acid solution | 250 | 15 | 1.0 | 61.5 |
| Cast onto polyester web; immersed in pure water | — | — | — | very low flow |
| Cast onto polyester web; immersed in 1.10 sp. gr. citric acid solution | — | 5 | 10.0 | 11.0 |
| Cast onto polyester web | — | 7 | 10.0 | 457.0 |

(1)(cc/cm$^2$/min)

EXAMPLE 11

CONTINUED HYDROLYSIS OF CASTING SOLUTIONS CONTAINING HYDROCHLORIC ACID

Two casting solutions were prepared containing 15% of the type 8 polyamide polymer resin used in Example 1 and 19.0 and 21.25% hydrochloric acid respectively. The remainder of each solution consisted of an aqueous solution of 63 wt % citric acid. Viscosity measurements were made on each of the solutions immediately after a 6 hour mixing period and again 4 days later. The viscosity of each had dropped in half due to hydrolysis of the polymer. A shelf life of less than one week is indicated by the data, if a two-fold change in viscosity effects either the casting process or the properties of the membranes obtained.

EXAMPLE 12

To evaluate the effect of heating of a casting solution of type 8 nylon polymer on the resulting properties of a membrane, the following was performed. A casting solution containing 20% of the type 8 nylon of Example 1, 20.25% reagent hydrochloric acid, 37.6% powdered citric acid, and 22.15% water was prepared by mixing the ingredients for 4 hours and screening the solution through a nonwoven polyester cloth. This solution was cast onto a nonwoven polyester support cloth and immersed in a 1.23 specific gravity aqueous citric acid solution. It gave a membrane with a water bubble point of 24 psi indicating a pore size of 0.5 micrometer, and a water flow rate of 33 cc/cm$^2$/min at 10 psig differential pressure. When the casting solution was heated to 50° C. and cast in the same manner gave a water bubble point of 16 psi and a water flow rate of 55 cc/cm$^2$/min. Heating the casting solution increased the pore size of the membrane obtained and increased the water flow rate, giving some control over pore size at the point of casting.

EXAMPLE 13

To evaluate the effect of using formic acid as the solvent in place of hydrochloric acid, a casting solution was formed from 14.7% type 8 nylon, 60% formic acid (90 wt %), 15.9% powdered citric acid and 9.4% water by mixing at room temperature for 4 hours. After screening through a polyester cloth, the casting solution was immediately cast onto a nonwoven polyester support web and immersed in pure water to form a membrane having a water flow rate of 32 cc/cm²/min at 10 psig differential pressure and a water bubble point of 17 psi indicating a pore size of about 1.0 micrometer.

The viscosity of this casting solution was monitored over the 24 hour period following the complete dissolution of the polymer and it was found that the solution viscosity had tripled 24 hours after mixing. Increasing viscosity is indicative of continued crosslinking of the polymer in solution which would present control problems in commercial process design and controls in assuring uniform membrane properties and performance.

EXAMPLE 14

A 30 pound batch of casting solution was formed by mixing 20% of the type 8 nylon of Example 1, 20.25% reagent hydrochloric acid, 37.6% citric acid powder, and 22.15% water for 3 hours at room temperature. This solution was coated onto a nonwoven polyester support web and immersed in 1.22 specific gravity aqueous citric acid. The resulting membranes of various thicknesses behaved as shown in Table 4. Table 4 indicates that the membranes of this invention have water flow rates for the given pore size rating equal to or better than the best competitive commercial nylon membranes now on the market. This batch of lacquer produced several hundred feet of acceptable, defect-free membrane with an assignable pore size rating.

TABLE 3

RESULTS OF EXAMPLE 14

| Sample Numbers | Water Bubble Point (psi) | Pore Size Rating (um) | Water Flow Rate (cc/cm²/min) | Thickness (um) |
| --- | --- | --- | --- | --- |
| 1 | 30 | 0.4 | 32 | 75 |
| 2-5 | 29-32 | 0.4 | 34-52 | 100 |
| 6-8 | 29-30 | 0.4 | 44-48 | 120 |

EXAMPLE 15

A 30 pound casting solution was prepared as in Example 14 except that the quantity of hydrochloric acid was reduced from 20.25% to 19.75% and the polymeric solids content of the solution was increased to 20.5%. The citric acid and water content were reduced proportionately. The mix time was 4.5 hours and the immersion bath was aqueous citric acid at 1.24 specific gravity. The results in Table 5 show that a membrane of commercial quality has been produced with a 0.2 micrometer (sterilizing grade) pore size. Several hundred feet of acceptable membrane were made from this batch of casting solution.

TABLE 4

CHARACTERISTICS OF MEMBRANES OF EXAMPLE 15

| Sample Numbers | Water Bubble Point (psi) | Pore Size rating (um) | Water Flow Rate (cc/cm²/in) | Thickness (um) |
| --- | --- | --- | --- | --- |
| 1-3 | 54-60 | 0.2 | 12-14 | 60-80 |
| 4-6 | 59-60 | 0.2 | 8.9-9.4 | 105-110 |

EXAMPLE 16

Three separate 300 g casting solutions were prepared in which varying amounts of maleic acid were added to the mix of other ingredients before the polymer was added to the mix vessel. The compositions and physical performance characteristics are given in Table 5. Samples of each of these membranes were submitted to an independent laboratory for Southern Blot DNA testing and for DNA plaque lift transfer testing. Each of these samples, regardless of maleic acid content, performed well in each of these tests. In fact, each membrane performed as well as or better than nylon 46 or nylon 66 membranes currently used in such applications.

TABLE 5

RESULTS OF EXAMPLE 16

| | Composition 1 | Composition 2 | Composition 3 |
| --- | --- | --- | --- |
| Ingredient | | | |
| Type 8 nylon | 20.5% | 20.5% | 20.5% |
| Reagent HCl | 19.75 | 19.25 | 18.5 |
| Citric Acid (dry) | 37.65 | 36.1 | 34.6 |
| Water | 22.1 | 21.15 | 20.4 |
| Maleic Acid (dry) | 0.0 | 2.0 | 5.0 |
| Characteristics | | | |
| Water Bubble (psi) | 30 | 21 | 21 |
| Pore Size (um) | 0.4 | 0.5 | 0.5 |
| Water Flow Rate (cc/cm²/min) | 15.1 | 32.0 | 57.0 |

EXAMPLE 17

Solutions of 12% of the type 8 nylon polymer of Example 1 and a similar polymer in which about 40% of the amide groups have been derivatized (BCI #818) were formed by mixing each of the polymers separately in 90% formic acid for one hour at 25° C. The viscosity of these solutions was measured immediately after polymer dissolution and again four hours later. It was found that the viscosity had increased 10 to 20 percent during that four hour period. These solutions were than allowed to stand at room temperature over night. Both solutions converted to a very high viscosity gel mass, indicating significant additional crosslinking had occurred. The hydrolysis or chain scission of the backbone polymer is considerably slower in formic acid than in hydrochloric acid and hence the control of solution viscosity is not well-maintained in formic acid solutions through a balance between additional crosslinking which increases viscosity and additional chain scission by hydrolysis which decreases viscosity.

EXAMPLE 18

Casting solutions were made using three different grades of type 8 nylons, each grade having a different degree of alkoxyalkyl substitution. The three casting solutions had the same composition on a percentage basis, i.e. 20% polymer, 20.25% reagent hydrochloric acid, 37.65% dry citric acid, and 22.1% water. Each of the solutions was cast continuously by coating a nonwoven polyester support web and immersion in aqueous citric acid with a specific gravity of 1.24. The three polymers behaved similarly in this processing regimen to give very similar, reproducible results as given in Table 6.

TABLE 6
RESULTS OF EXAMPLE 18

| Approx. Degree Substit'n (%) | Water Bubble Point (psi) | Pore Size Rating (um) | Water Flow Rate (cc/cm²/min) | Thickness (um) |
|---|---|---|---|---|
| 33 | 20—20 | 0.5 | 80–84 | 100 |
| 45 | 20–21 | 0.5 | 80–94 | 100 |
| 50 | 23—23 | 0.5 | 80–84 | 100 |

EXAMPLE 19

ALCOHOL SOLUBILITY OF TYPE 8 NYLON MEMBRANES

The starting type 8 nylon raw polymer of Example 1 was tested and found to fully dissolve in methanol and ethanol at room temperature. When a small quantity of casting solution (formed by dissolving the polymer in hydrochloric acid, citric acid and water) was dropped into methanol, a precipitate formed indicating that the polymer was crosslinked and no longer soluble in methanol. Membranes formed from the casting solution were tested before and after soaking in methanol at 62° C. for one-half hour and found to be uneffected by the alcohol exposure as shown in Table 7.

TABLE 7
ALCOHOL SOLUBILITY OF CROSSLINKED TYPE 8 NYLON MEMBRANES

| | Water Bubble Point (psi) | Pore Size Rating (um) | Water Flow Rate (cc/cm²/min) |
|---|---|---|---|
| Before Methanol Soak | | | |
| Sample 1 | 29–33 | 0.4 | 32–52 |
| Sample 2 | 54–60 | 0.2 | 9–15 |
| After Methanol Soak | | | |
| Sample 1 | 31 | 0.4 | 39 |
| Sample 2 | 60 | 0.2 | 9 |

What is claimed is:

1. A hydrophilic alcohol-insoluble polyamide microporous membrane containing crosslinked amide groups of the structure:

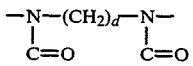

wherein d is an integer of about 1 to 3.

2. The membrane of claim 1 wherein the membrane is prepared from a partially N-alkoxyalkyl substituted polyamide polymer resin in which about 10 to 70% of the amide groups are substituted amide groups of the formula:

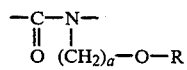

wherein a is an integer from about 1 to 3 and R is hydrogen or an alkyl group having about 1 to 6 carbon atoms; and the substituted amide groups are separated by groups selected from methylene ($CH_2$) and amide (CONH) groups.

3. The membrane of claim 2, wherein the membrane is further prepared with a compound which forms a crosslinking bridge between an alkoxyalkyl group and an amide.

4. The membrane of claim 3, wherein the compound is selected from the group consisting of multifunctional organic acids, anhydrides, lactones, and esters.

5. The membrane of claim 3, wherein the compound is selected from the group consisting of maleic acid, maleic anhydride, gamma-butyrolactone, acetoacetic ethyl ester, and glutaraldehyde.

6. The membrane of claim 1 wherein the membrane is prepared from a polyamide resin which has the general formula:

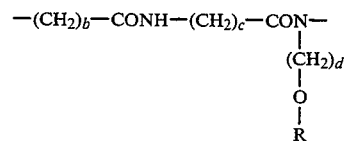

wherein b is an integer of about 2 to 10, c is an integer of about 2 to 10, d is an integer of about 1 to 3, and R is hydrogen or an alkyl group having about 1 to 4 carbon atoms.

7. The membrane of claim 6 wherein b is about 4 to 8 and c is about 2 to 6.

8. The membrane of claim 1 wherein the pores have a bimodal pore structure in which smaller micropores having a diameter of about 0.1 to about 20 um are on the surface and larger interconnecting pores that do not appear at the surface of the membrane are in the interior.

9. The membrane of claim 1 which is skinless and the pores which extend through the membrane from one surface to the other are substantially uniform or slightly tapered.

10. The membrane of claim 1 wherein the polyamide membrane further contains methylene ($CH_2$) groups and amide (NHCO) groups and the ratio of methylene to amide groups is about 2.3 to about 15.

11. The membrane of claim 10 wherein the ratio of methylene to amide groups is about 5 to about 12.

12. The membrane of claim 10 wherein the ratio of methylene to amide groups is about 8 to about 10.

13. A process of preparing an alcohol-insoluble microporous polyamide membrane which comprises the steps of (i) dissolving in a solvent an alcohol soluble polyamide resin in which about 10 to 50% of the amide groups are substituted with alkoxyalkyl groups of the formula $(CH_2)_d$—O—R wherein d is an integer of about 1 to 3, and R is hydrogen or an alkyl group having about 1 to 4 carbon atoms; (ii) acidifying the resin solution to controllably partially crosslink the resin; (iii) casting the acidified solution into a casting bath which is a nonsolvent for the crosslinked resin to form the microporous membrane; (iv) rinsing the resulting membrane; and (v) drying the resulting membrane.

14. The process of claim 13 wherein the solvent comprises an acid and steps (i) and (ii) are performed simultaneously and not sequentially.

15. The product produced by the process of claim 13.

16. In a process of lifting a plaque comprising using a microporous membrane, the improvement comprising using the membrane of claim 15.

17. In a process of performing a Southern blot comprising using a microporous membrane, the improvement comprising using the membrane of claim 15.

18. In a process of performing a Southern alkali blot comprising using a microporous membrane, the improvement comprising using the membrane of claim 15.

19. In a process of lifting a plaque comprising using a microporous membrane, the improvement comprising using the membrane of claim 1.

20. In a process of performing a Southern blot comprising using a microporous membrane, the improvement comprising using the membrane of claim 1.

21. In a process of performing a Southern alkali blot comprising using a microporous membrane, the improvement comprising using the membrane of claim 1.

22. The process of claim 13, wherein the resin solution further contains a compound which forms a crosslinking bridge between an alkoxyalkyl group and an amide.

23. The process of claim 22, wherein the compound is selected from the group consisting of multifunctional organic acids, anhydrides, lactones, and esters.

24. The process of claim 22, wherein the compound is selected from the group consisting of maleic acid, maleic anhydride, gamma-butyrolactone, acetoacetic ethyl ester, and glutaraldehyde.

25. The product produced by the process of claim 22.

* * * * *